(12) United States Patent
Huang et al.

(10) Patent No.: US 11,794,420 B2
(45) Date of Patent: Oct. 24, 2023

(54) ADVANCED SINGLE VACUUM BAG PROCESS AND ASSEMBLY FOR POLYMER COMPOSITE MANUFACTURING AND REPAIR

(71) Applicant: Luna Labs USA, LLC, Charlottesville, VA (US)

(72) Inventors: Jianhua Huang, Blacksburg, VA (US); Daniel Robert Metrey, Blacksburg, VA (US)

(73) Assignee: LUNA LABS USA, LLC, Charlottesvile, VA (US)

( * ) Notice: Subject to any disclaimer, the term of this patent is extended or adjusted under 35 U.S.C. 154(b) by 32 days.

(21) Appl. No.: 17/616,094

(22) PCT Filed: Jun. 1, 2020

(86) PCT No.: PCT/US2020/035500
§ 371 (c)(1),
(2) Date: Dec. 2, 2021

(87) PCT Pub. No.: WO2020/247295
PCT Pub. Date: Dec. 10, 2020

(65) Prior Publication Data
US 2022/0297395 A1    Sep. 22, 2022

Related U.S. Application Data

(60) Provisional application No. 62/856,236, filed on Jun. 3, 2019.

(51) Int. Cl.
*B29C 70/34* (2006.01)
*B29C 70/54* (2006.01)
(Continued)

(52) U.S. Cl.
CPC .......... *B29C 70/342* (2013.01); *B29C 70/541* (2013.01); *B29K 2063/00* (2013.01); *B29K 2307/04* (2013.01)

(58) Field of Classification Search
CPC .................................................... B29C 70/342
See application file for complete search history.

(56) References Cited

U.S. PATENT DOCUMENTS 4,311,661 A * 1/1982 Palmer ............... B29C 70/44
264/102
5,236,646 A    8/1993 Cochran et al.
(Continued)

FOREIGN PATENT DOCUMENTS

DE        101 57 655          6/2003
WO    WO-2013/186389 A1 * 12/2013
WO    WO-2015/157486 A1 * 10/2015

OTHER PUBLICATIONS

International Search Report for PCT/US2020/035500 dated Sep. 7, 2020, 4 pages.
(Continued)

*Primary Examiner* — Jeffry H Aftergut
(74) *Attorney, Agent, or Firm* — NIXON & VANDERHYE P.C.

(57) ABSTRACT

Advanced single vacuum bag (ASVB) fabrication methods and assemblies are provided to manufacture and repair polymer composites whereby a rigid check plate is mounted over an uncured laminate by a thermally collapsible check plate stand. The check plate stand thereby maintains a gap between the check plate and the uncured laminate during first stage processing conditions, yet is capable of thermally collapsing during subsequent second stage processing conditions to thereby allow the check plate to fall into compressive contact with the uncured laminate After the check plate collapses onto the uncured laminate, the compressive
(Continued)

force of the check plate will be transferred to the laminate to consolidate the laminate as desired and thereby form an at least partially cured polymer composite structure of high quality.

22 Claims, 5 Drawing Sheets

(51) Int. Cl.
*B29K 63/00* (2006.01)
*B29K 307/04* (2006.01)

(56) References Cited

U.S. PATENT DOCUMENTS

| | | |
|---|---|---|
| 8,262,841 B2 | 9/2012 | Watson et al. |
| 2012/0080135 A1 | 4/2012 | Evens et al. |

OTHER PUBLICATIONS

Written Opinion of the ISA for PCT/US2020/035500 dated Sep. 7, 2020, 6 pages.

\* cited by examiner

ADVANCED SINGLE VACUUM BAG PROCESS AND ASSEMBLY FOR POLYMER COMPOSITE MANUFACTURING AND REPAIR

CROSS-REFERENCE TO RELATED APPLICATION

This application is the U.S. national phase of International Application No. PCT/US2020/035500 filed Jun. 1, 2020 which designated the U.S. and claims priority to U.S. Provisional Patent Application No. 62/856,236 filed Jun. 3, 2019, the entire contents of each of which are hereby incorporated by reference.

GOVERNMENT RIGHTS

This invention was made with Government support under the following Government awarded contracts: NASA STTR Phase I Program, Contract Number NNX17CK09P. The Government has certain rights to the invention.

FIELD

The embodiments disclosed herein relate generally to non-autoclave fabrication and repair of fiber reinforced polymer composite structures. According to the disclosed embodiments, the methods and assemblies allow a single vacuum bag to be used to manufacture fiber reinforced polymer composites with very low porosity (e.g., about 1% by volume or less) which is generally achievable only with more complex autoclave or double vacuum bag manufacturing processes in the prior art.

BACKGROUND

It is well known that high quality fiber reinforced polymer composites can be fabricated using autoclaves. However, the use of an autoclave is costly in terms of capital investment, limits production speed, and limits the size of the composite parts that can be produced. One of the cost-effective techniques utilized to fabricate composites without resorting to an autoclave is a single vacuum bag (SVB) process heated by an oven or pad heaters. One problem with conventional SVB processes however is the difficulty to produce cured polymer composite products with low void content (e.g. about 1% by volume or less). The presence of a high void content in a composite part, typically resulting from entrapped air, decreases the mechanical properties of the material and therefore should be avoided.

The issue of void content in cured composites is further exasperated with use of a reactive resin matrix or solvent-containing prepreg. In order to produce substantially void-free composites (e.g., about 1% by volume or less), it is important to eliminate entrapped air, volatiles and/or solvents before commencing forced consolidation. Removal of air, volatiles and/or solvents is however difficult to accomplish with the traditional SVB processes because a vacuum-generated compaction force compresses and binds the prepreg plies tightly together, blocking the pathways for the entrapped air and/or volatiles to escape and be exhausted from the laminate. In addition, the atmospheric pressure associated with the conventional SVB processes tends to create excessive resin flash out of the composite during the B-stage period. As a result, resin content and net shape of the consolidated laminate become difficult to control.

To fabricate or repair polymer composites with improved quality and low void content, a double vacuum bag (DVB) process, also known as double vacuum debulk (DVD), has been developed. See in this regard, T. H. Hou et al, Processing and Properties of a Phenolic Composite System, Journal of Reinforced Plastics and Composites, Vol. 25, No. 5 (2006), 495-502 and G. Gardiner, Double bagging through three decades, Composites World, Nov. 30, 2010, the entire content of each such publication being expressly incorporated hereinto by reference. A debulking process can be performed under vacuum when using a DVB process without applying compaction force on the laminate, which in turn increases the transverse air and volatile flow at the initial or B-stage of the cure cycle. This is achieved by applying a second vacuum via a rigid chamber on top of the lower vacuum bagged lay-up. Many investigations have shown that essentially void free composite laminates may be produced with DVB processing technology, resulting in significantly enhanced mechanical properties compared to those fabricated with the traditional SVB process. See for example, U.S. Pat. Nos. 5,236,646 and 7,186,367 (the entire content of which is expressly incorporated hereinto). However, compared to SVB, the DVB process is complicated, requires dedicated tooling and additional equipment, and has limits on the size of the composites it may produce.

It is thus an object of the embodiments disclosed herein to develop a polymer composite fabrication technique that can be accomplished in the absence of an autoclave but still retain the advantages of SVB and DVB fabrication technologies and avoid their disadvantages. More specifically, it is an object of the embodiments disclosed herein to provide composite fabrication techniques that perform similar to DVB processes but are relatively easy or simple to implement. It is towards fulfilling such objects that the herein disclosed embodiments are directed.

SUMMARY

In general, the embodiments of the herein disclosed invention are directed to methods and fabrication assemblies that allow single vacuum bag (SVB) processing techniques to be used to manufacture fiber reinforced polymer composites with very low void content. According to certain embodiments, cured polymer composites can be formed with very low void volumes of about 1% by volume, or even about 0.50% by volume, or less.

Important to the embodiments disclosed herein, a check plate assembly is provided which necessarily includes a rigid check plate and a thermally collapsible check plate stand. The thermally collapsible check plate stand supports the check plate above an uncured laminate during a first processing stage so that a gap is defined between the check plate and the top surface of the uncured laminate. The processing conditions of such first processing stage allow for entrapped air and/or volatiles to be removed from the uncured laminate. Thereafter, the temperature may be elevated to achieve a predetermined activation temperature at which the check plate stand will at least partially melt and thermally collapse to thereby allow the check plate to fall into compressive contact with the uncured laminate. Such compressive contact may be maintained while subjecting the uncured laminate to second processing conditions at which the resin will at least partially (or completely) cure. In such a manner, the check plate assembly as disclosed herein provides for unique performance results in terms of high quality (e.g., low void volume) polymer composites.

The check plate can be made by joining together at least two pieces of rigid plate members formed of a material (e.g., metal or ceramic) that is capable of withstanding the temperature and pressure conditions encountered during processing. According to some embodiments, the top and bottom plate members are configured and dimensioned so as to substantially conform to the outside and inside configuration and dimension, respectively, of a dam structure formed, e.g., of silicone rubber or other thermally stable materials, which surrounds the periphery of the uncured laminate.

The thermally collapsible check plate stand may be formed at least partially or entirely from thermoplastic polymers, such as polyolefins, polyamides, polyesters and the like. The check plate stand will thereby at least partially melt or soften at a temperature that is at a temperature equal to or greater than the heat deflection temperature or melting point of the thermoplastic polymer forming at least a part of the check plate stand (hereinafter referenced as the "activation temperature"). The check plate stand will thereby be capable of being thermally collapsible at such elevated activation temperature during the processing cycle for the uncured laminate.

The check plate stand may itself be a one-piece check stand member which surrounds the periphery of the uncured laminate and may be positioned directly on a tool plate which supports the uncured laminate or positioned on the dam which itself surrounds the periphery of the uncured laminate. Alternatively or additionally, the check stand may be in the form of discontinuous multiple check plate stand members which likewise can be positioned directly on a tool plate or on the dam. The continuous or discontinuous check plate stand member(s) may alternatively or additionally be an integral part of the dam. However embodied, the check plate stand is of sufficient height to allow the check plate to be positioned in spaced relationship with the top surface of the uncured laminate so as to define a gap therebetween.

According to one aspect of the embodiments disclosed herein, a method is provided for fabricating an at least partially cured fiber-reinforced polymer composite from an uncured laminate formed of a stack of uncured composite plies comprised of reinforcing fibers impregnated with an uncured or partially cured resin. The uncured laminate is positioned within an interior space of a vacuum bag and may be surrounded by a dam.

The check plate assembly comprised of the check plate and the thermally collapsible check plate stand is positioned within the interior space of the vacuum bag relative to the uncured laminate such that a gap is established between the check plate and the top surface of the uncured laminate.

A processing cycle will therefore be conducted so as to initially remove entrapped air from the uncured laminate in a first processing stage and then at least partially cure the resin of the uncured laminate inside the vacuum bag during a second processing stage. The vacuum bag is itself adapted to be connectable to a vacuum system to allow a vacuum to be drawn within the interior space of the vacuum bag. Heat is also applied within the interior space during the processing cycle.

The first stage of the processing cycle may be performed by subjecting the uncured laminate under vacuum to a first processing temperature for a first predetermined time. Since the check plate stand has a sufficiently high melt point to be capable of withstanding the first processing temperature, the check plate stand will remain rigid thereby maintaining the gap between the check plate and the top surface of the laminate. Thereafter, the temperature of the processing cycle will be elevated from the first processing temperature to a higher predetermined activation temperature at which the check plate stand at least partially melts or softens. This partial melting or softening will thereby allow the check plate stand to thermally collapse which in turn causes the check plate to fall into compressive contact with the top surface of the uncured laminate.

The second processing stage can be initiated upon collapse of the check plate stand and compressive contact being made between the check plate and the uncured laminate. During the second processing state, the laminate is subjected under vacuum to second processing conditions comprised of a second processing temperature greater than the predetermined activation temperature for the check stand. The compressive contact between the check plate and the laminate may thus be maintained under such second processing conditions for a sufficient time to allow the stacked plies of the laminate to consolidate and the resin to at least partially or completely cure.

As noted previously, the thermally collapsible check plate stands may at least be partially formed of a thermoplastic material having a heat deflection or melting point which allows the check plate stands to remain rigid during the first stage of the processing cycle whereby the gap is maintained during such first stage of the processing cycle between the top surface of the laminate and the check plate, yet at least partially melt or soften and thermally collapse to allow the check plate to compressively contact the uncured laminate during the second stage of the processing cycle. By maintaining the gap during the first stage of the processing cycle, air and/or volatile components that are entrapped within the uncured laminate can escape from the uncured laminate and then be exhausted from the vacuum bag. A porous breather film surrounding the check plate assembly may be provided to further aid in the removal of air and/or volatile components.

According to another aspect of the invention, a fabrication assembly is provided for fabricating at least a partially cured polymer composite structure from an uncured laminate comprised of stacked plies of a reinforcing fibrous mat impregnated with an uncured resin. The fabrication assembly may therefore comprise a check plate assembly which includes (i) a check plate which is sized and configured to be brought into compressive contact with the uncured laminate positionable therebelow during a processing cycle for the uncured laminate, and (ii) a thermally collapsible check plate stand. The check plate stand is sufficiently rigid to positionally support the check plate such that a gap is established between the check plate and the top surface of the laminate during a predetermined elevated temperature during the processing cycle. The check plate stand is however thermally collapsible at a predetermined elevated temperature to thereby allow the check plate to fall into compressive contact with the uncured laminate and thereby consolidate the stacked plies thereof.

These and other aspects of the present invention will become more clear after careful consideration is given to the following detailed description of a presently preferred exemplary embodiment thereof.

BRIEF DESCRIPTION OF THE DRAWINGS

Reference will be made to the accompanying drawing Figures, wherein.

DETAILED DESCRIPTION

Figure 1A:
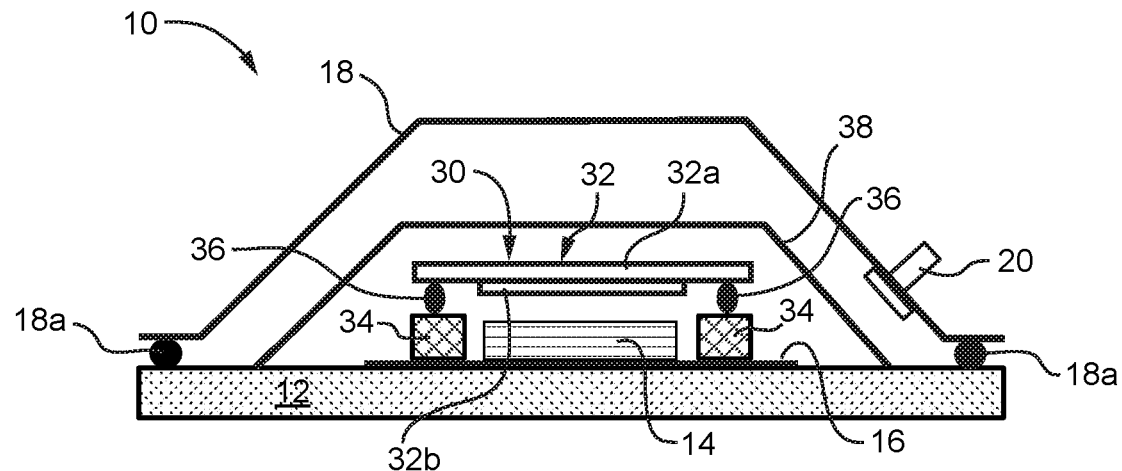
FIGS. 1A and 1B are schematic cross-sectional elevational views of an advanced single vacuum bag (ASVB) fabrication assembly in accordance with an embodiment of the invention disclosed herein during first and second processing stages, respectively, of an uncured laminate and thereby form an at least partially cured fiber reinforced composite.
Figure 1B:
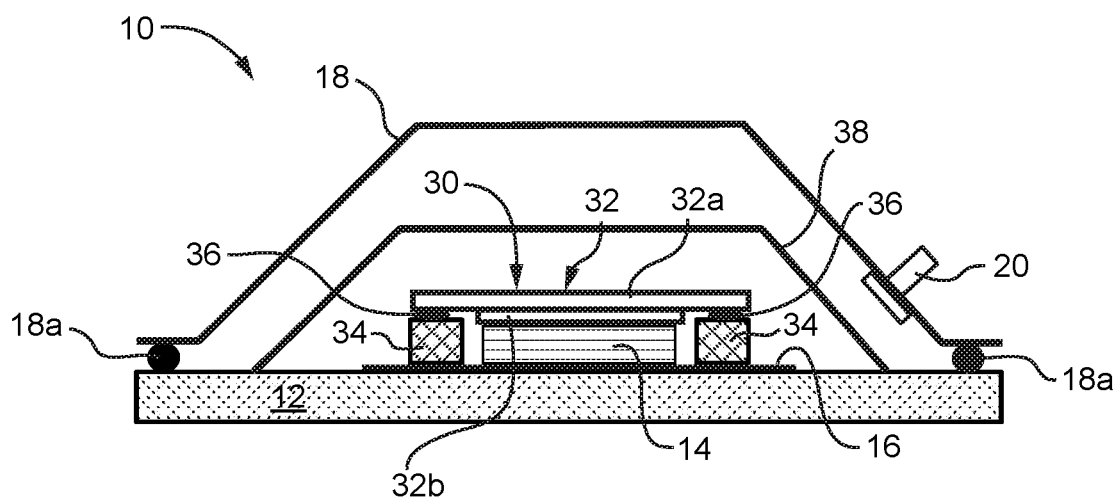

An embodiment of a single vacuum bag fabrication assembly in accordance with an embodiment of this invention is shown in FIGS. 1A and 1B and will hereinafter be referenced as the advanced single vacuum bag (ASVB) assembly 10. The ASVB assembly 10 of the embodiment shown in FIG. 1A includes a tooling plate 12 for supporting an uncured composite laminate 14 to be cured and consolidated by the ASVB assembly 10. As is conventional, the uncured laminate 14 is comprised of multiple stacked plies of reinforcing fibrous mats (e.g., sheets or mats of woven or non-woven carbon fibers) impregnated with an uncured or partially cured resin (e.g., epoxy resin).

A release film 16 may be interposed between the uncured laminate 14 and the tooling plate 12 to assist in removal of the cured composite laminate when cured. As is conventional, a vacuum bag 18 is provided to define an interior space or cavity which is sealed against ambient air ingress along its edges by suitable seals 18a. A vacuum port 20 is used to connect the interior space defined by the vacuum bag 18 with a vacuum source (not shown).

A check plate assembly 30 is provided within the interior space defined by the vacuum bag 18 of the ASVB assembly 10 and is comprised of a rigid check plate 32, a rigid or semi-rigid dam 34 which continuously surrounds the periphery of the uncured laminate 14 and a thermally collapsible check plate stand 36. A porous breather film 38 surrounds the check plate assembly 30 to allow air and/or volatiles to escape the interior space defined within the vacuum bag 18 through the vacuum port 20.

The check plate 32 is formed of a rigid material (e.g., a rigid metal such as steel or aluminum or a ceramic material) of sufficient weight and configuration so as to exert a compressive force onto the upper surface of the uncured laminate 14 and thereby consolidate the laminate 14 during the curing process to be described in greater detail below. The dam 34 is typically a frame structure which continuously surrounds the periphery of the uncured laminate 14. In the embodiments depicted, the check plate 32 is formed of upper and lower rigid check plate members 32a, 32b which are joined together and are configured and dimensioned so as to substantially conform to the outside and inside configuration and dimension, respectively, of the dam 34.

The dam 34 has a sufficient height dimension so as to support the check plate 32 in a spaced relationship relative to the composite laminate 14 when one or more of the check plate stands 36 is positioned thereon but still allow the check plate 32 to compressively contact the top surface of the composite laminate 14 when the check plate stands 36 collapse as described hereinafter. As such, a gap is defined between the check plate 32 and the top surface of the uncured laminate 14. While the check plate stands 36 are shown as being supported by the dam 34, they may also be positioned directly on the tool plate 12 laterally of the dam 34, in which case the check plate stands 36 are of a sufficient height to define the gap between the check plate 32 supported by the check plate stands and the top surface of the composite structure 14. Furthermore, the check plate stands may a continuous check plate stand member which surrounds the periphery of the uncured laminate or may be formed of discontinuous discrete check plate stand members.

The check plate stand 36 is formed of a thermally sensitive material which at least partially melts or softens at a predetermined elevated temperature during the heating and curing profile for the particular composite structure being fabricated from the uncured laminate 14. In accordance with embodiments disclosed herein, the check plate stand 36 may be formed either entirely or at least partially of a thermoplastic material, e.g., polyamides, polyolefins such as polyethylene (PE), polypropylene (PP), polybutylene (PB) and the like, polyesters such as polybutylene terephthalate (PBT), polyethylene terephthalate (PET), polycaprolactone (PCL) and the like as well as alloys, blends and mixtures thereof. The specific thermoplastic material selected to form the check plate stand 36 will therefore have a heat deflection temperature or melting temperature at a specific predetermined elevated activation temperature encountered during the heating and curing cycle for the uncured laminate 14. Upon reaching such specific predetermined elevated activation temperature, therefore, the check plate stand 36 will at least partially melt or soften to an extent that the check plate stand 36 will collapse thereby in turn allowing the check plate 32 to fall under its own weight and atmospheric pressure exerted by the vacuum bag into compressive contact with the uncured laminate 14 therebelow so as to consolidate the laminate and form the composite structure during the curing cycle.

Figure 2:
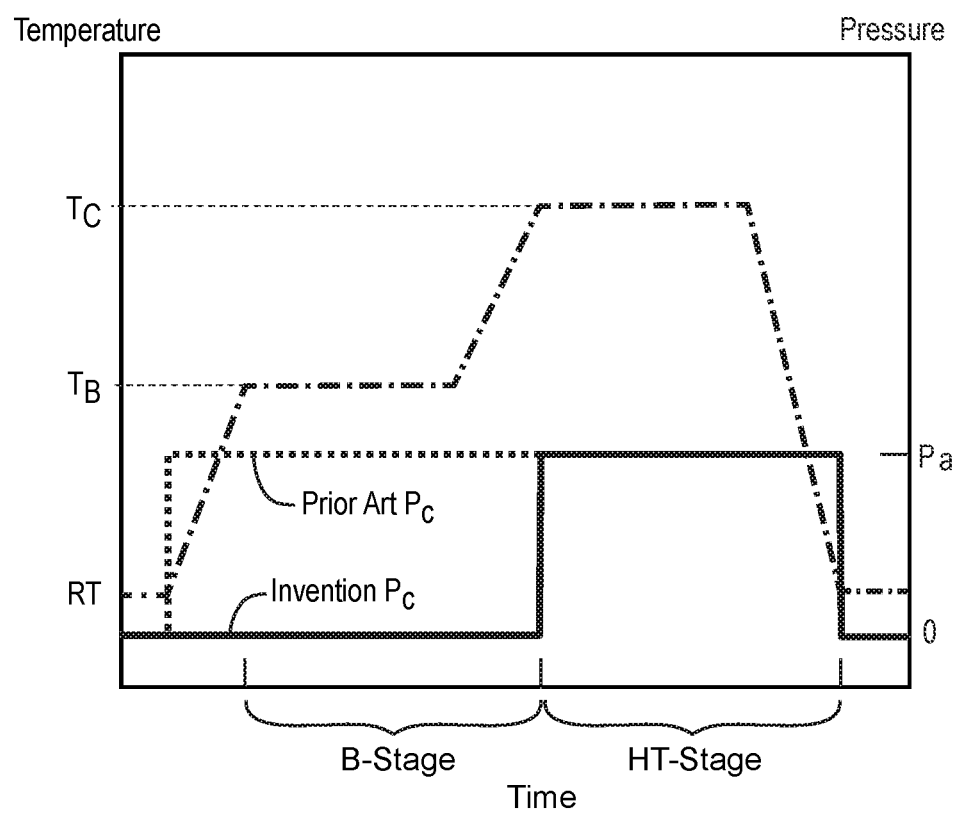
FIG. 2 is a plot of temperature and pressure vs. time profiles for curing cycles for polymer matrix composite fabrication using either the ASVB fabrication assembly of FIGS. 1A and 1B which embodies the herein disclosed invention or an SVB apparatus according to the prior art.

A typical cure cycle for an uncured laminate 14 is depicted in FIG. 2 using the ASVB assembly 10 as described above with reference to FIGS. 1A and 1B. In operation of the ASVB assembly 10, after vacuum is applied to the vacuum bag 18 through the vacuum port 20, the cure cycle depicted by the dash-dot line in FIG. 2 would typically start with an initial heating from room temperature (RT) to achieve a low temperature ($T_B$) phase of predetermined duration. As briefly noted above, during this initial low temperature ($T_B$) phase of the cure cycle, the check plate 32 is separated by a predetermined separation distance from and thereby does not physically contact the top surface of the uncured laminate 14. As such, the check plate 32 does not exert a compressive force on the uncured composite laminate 14 at such time. This operational state of the ASVB setup 10 is shown schematically in FIG. 1A.

Since the check plate 32 does not contact the uncured laminate 14 during the initial low temperature ($T_B$) phase of the cure cycle, the uncured laminate 14 under vacuum is not compacted by the atmospheric pressure at this stage (typically referenced as a B-stage of curing) as shown by the solid compaction pressure line (Invention $P_C$) in FIG. 2. The entrapped air/volatiles associated with the uncured laminate 14 when curing are therefore free to escape and be exhausted from the interior space of the vacuum bag 18 through the vacuum port 20. Such an escape of air/volatiles is restricted for the traditional SVB techniques of the prior art since the compaction pressure (Prior Art $P_C$) is present during the B-stage of the curing cycle.

When B-stage of the curing cycle ends and the high temperature stage (HT-stage) at a higher cure temperature ($T_C$) starts, the separation between the check plate 32 and the top surface of the uncured laminate 14 can be eliminated by allowing the check plate stand 36 to thermally collapse at a predetermined temperature above the initial low temperature $T_B$ thereby causing the check plate 32 to fall into compressive contact with the uncured laminate 14. According to certain embodiments disclosed herein, such an event can be realized, for example, by forming the check stand 36 at least partially from a thermoplastic material that is rigid and solid at the low temperature $T_B$ but softens or melts at a predetermined elevated temperature above the low temperature $T_B$ up to and including the high temperature $T_C$ sufficiently to allow the check stand 36 to collapse under the weight of the check plate 32 and atmospheric pressure exerted by the vacuum bag. Such a state is shown in FIG. 1B. After the check plate falls into compressive contact with the uncured laminate 14, the compaction force of the check plate 32 will be transferred to the uncured laminate 14 to thereby consolidate the composite plies as desired during curing. When the desired curing cycle ends, the now cured or semi-cured and fully consolidated composite structure formed from the previously uncured laminate 14 can then be removed from the ASVB assembly 10.

The embodiment of the ASVB assembly 10 described above is depicted as being suitable for fabrication of cured or semi-cured polymer composites in the form of flat composite panels. In addition to fabricating flat composite panels, however, the ASVB assembly can be employed to fabricate composite panels with contoured or irregular surfaces, such as a wedding cake repair patch to be used for bonded repair of a composite structure. The modified ASVB assembly 10' according to this embodiment shown in FIGS. 3A and 3B (wherein like reference numerals therein depict structures similar to those described above for the embodiment shown in FIGS. 1A and 1B) may be used for this purpose with a thermally conformable check plate member 40 that is sized and configured to receive therein the irregular shape of the uncured laminate 14'. The conformable check plate member 40 can be a flat or contoured plate formed of a thermoplastic material that softens or melts at a high temperature of the processing cycle.

Figure 3A:
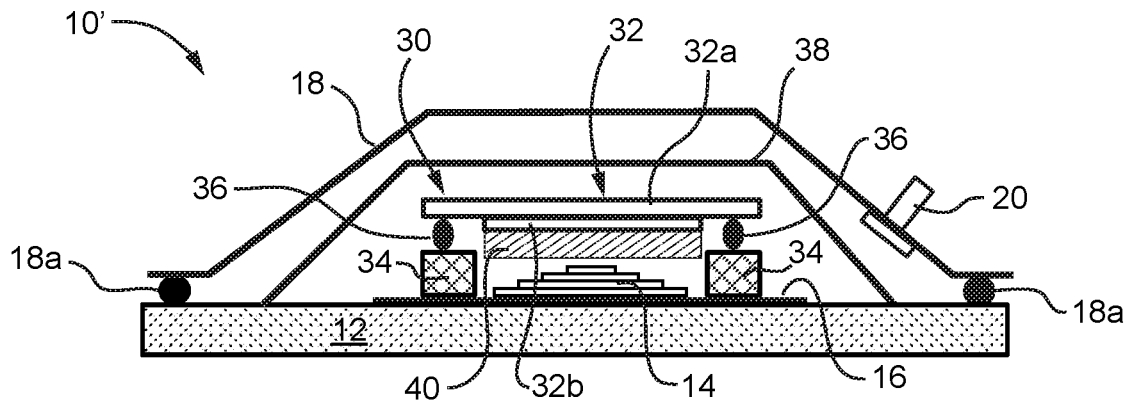
FIGS. 3A and 3B are schematic cross-sectional elevational views of an ASVB fabrication assembly in accordance with another embodiment of the invention disclosed herein which is especially adapted for fabricating or repairing fiber reinforced composites with non-uniform thickness and respectively depicting the apparatus during first and second stages of a processing cycle for such composite structure.
Figure 3B:
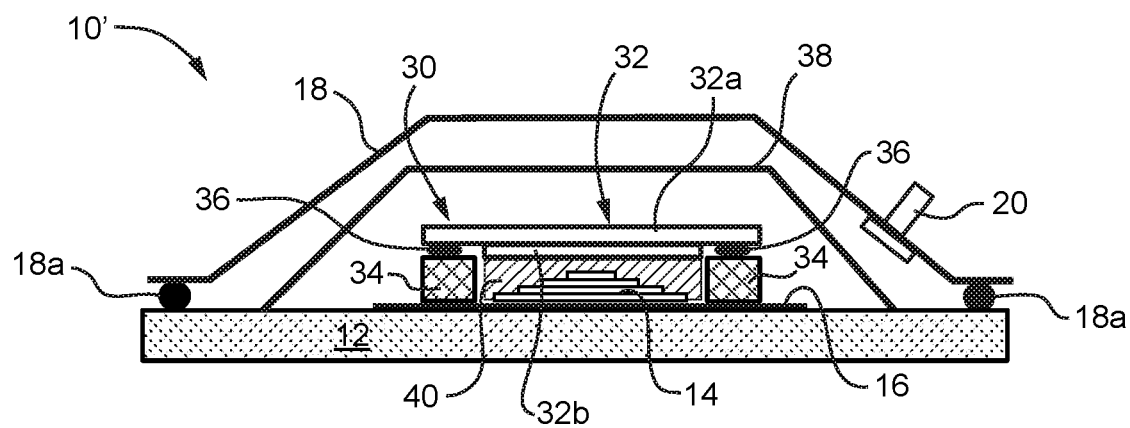

In operation, therefore, at the low cure temperature ($T_B$) of the ASVB assembly 10', there will exist a gap between the irregular uncured laminate 14' and the check plate member 40 which thereby allows the air/volatiles to escape during the B-stage curing at the low cure temperature ($T_B$) as described previously with respect to the ASVB assembly 10. Such a state is depicted in FIG. 3A. As the temperature during the cure cycle is elevated to the high cure temperature ($T_C$), the check plate stand 36 will thermally collapse thereby allowing the check plate 32 to fall onto and push against the conformable check plate member 40, thereby in turn causing the thermoplastic material of the check plate member 40 to flow until the gap between the check plate member 40 and the irregular uncured laminate 14' is filled. Such a state is shown in FIG. 3B. The irregular uncured laminate 14' can thus be cured and consolidated under uniform vacuum pressure to form an irregular shaped composite structure.

According to the embodiments disclosed herein, composite materials having low voids by volume can be achieved with a single vacuum bag. The quality of the composites is comparable to that of composites fabricated using DVB processes of the prior art. The advantages of the embodiments of this invention will become clearer by reference to the following non-limiting Examples.

EXAMPLES

Example 1

The advanced single vacuum bag (ASVB) apparatus 10 in accordance with an embodiment of this invention depicted in FIG. 1A was used for fabricating composite panels from resin pre-impregnated carbon fiber fabric (prepreg). For these composite panels, CYCOM® 5320-1 carbon fiber/epoxy prepreg sheets commercially available from Solvay were cut and stacked inside a silicone rubber picture frame so that the frame completely surrounded the stacked prepreg layers. Collapsible check plate stands made of low density polyethylene (LDPE, melting temperature 105~115° C.) were placed on top of a dam which surrounded the stack of prepreg sheets. A check plate was then placed on top of the LDPE check plate stands. The check plate was made by joining two pieces of aluminum sheets together with the dimensions of the top and bottom sheets being the same as the outside and inside dimensions of the surrounding dam (picture frame), respectively. Breather and vacuum bag films were then applied and sealed to the tool plate to form the vacuum bag in exactly the same fashion as conventional single vacuum bag (SVB) processing techniques.

The assembly described above was then placed in a convection oven and connected to a vacuum pump. The following cure cycle profile recommended by the prepreg manufacturer was used for curing:

Under full vacuum, the oven was ramped from room temperature to 60° C. in 20 minutes and held at 60° C. for 2 hours.

The oven was heated to 121° C. in 1 hour and held at that temperature for 2 hours.

Thereafter, the oven was ramped further to 177° C. in 40 minutes and held at that temperature for 2 hours.

Finally, the cycle completed after the oven was cooled to below 60° C. at a rate of less than 5° C./min.

The vacuum was maintained during the whole curing cycle. Since the check plate stand was solid and rigid at 60° C., the gap distance between the check plate and the stack of prepreg sheets was maintained during the first ramp-up period. The stack of prepreg sheets under vacuum at that time was thereby free from the compaction force of the check plate. When temperature was increased to 121° C. or above, the check plate stands melted thereby bringing the check plate into compressive contact with the laminate under vacuum. The compaction force was transferred from the check plate to the stack of prepreg sheets as was desired to consolidate the composite and thereby form a cured composite material with low void content.

Figure 4:
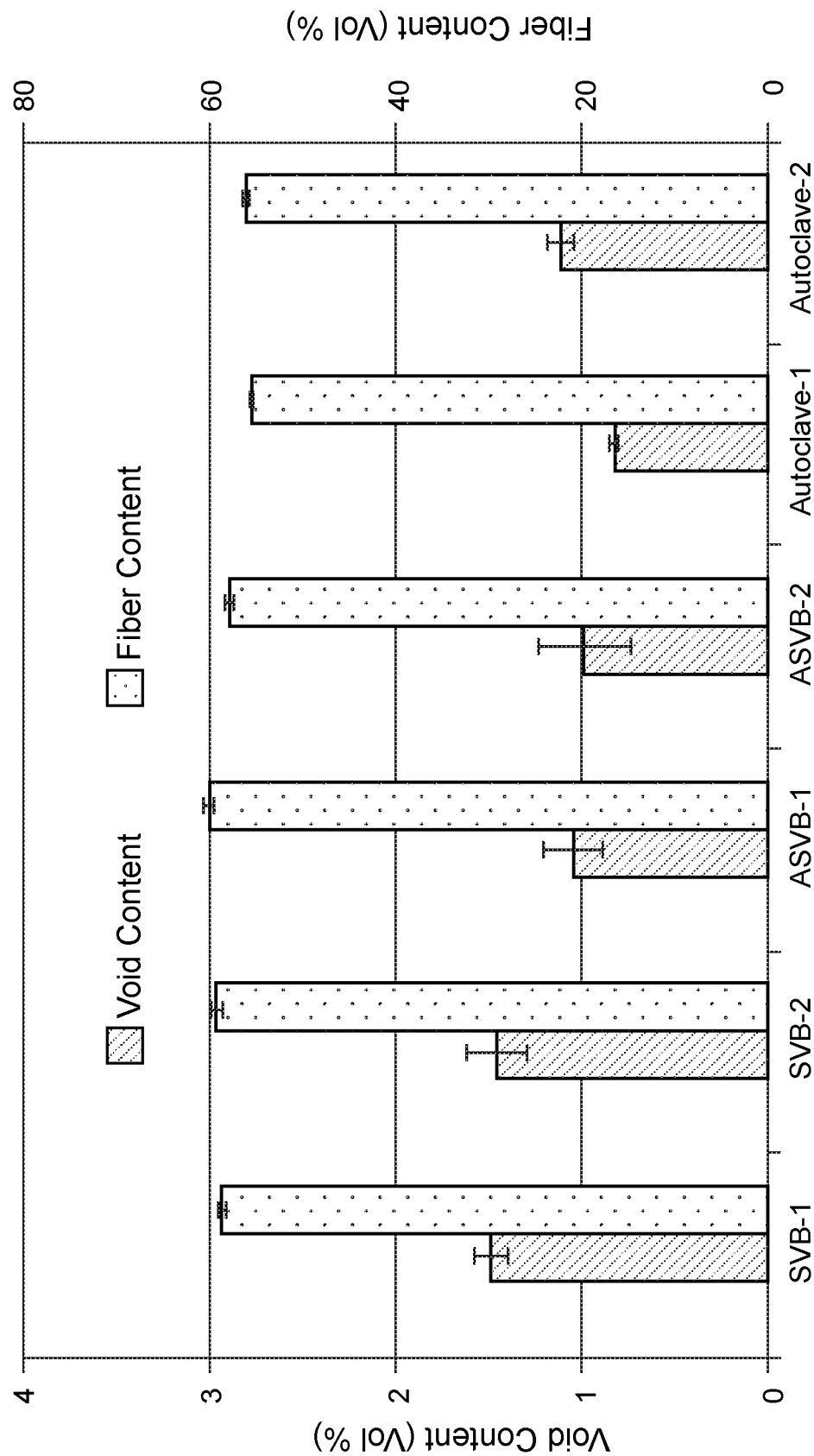
FIG. 4 is a graphical representation comparing the void content and carbon fiber volume content for composite panels fabricated according to an embodiment of the advanced single vacuum bag (ASVB) method of the present invention in comparison to conventional single vacuum bag (SVB) and autoclave fabrication processes according to the prior art as described in Example 1 below.

The void volume percent of the panels fabricated using the ASVB process as described above was evaluated generally in accordance with ASTM D3171-99 (2004). The results of such evaluation were compared to the results of composite panels fabricated either with an autoclave or with traditional SVB fabrication techniques. As can be seen from the graphical presentation of FIG. 4, the ASVB panels made in accordance with an embodiment of the invention contain only about 1% voids by volume in average which is comparable to voids of the composite panels fabricated using an autoclave and significantly lower than the composite panels fabricated via the traditional single vacuum bag (SVB) process of the prior art.

Example 2

The ASVB process according to an embodiment of the invention as depicted in FIG. 1 was employed to fabricate carbon fiber/epoxy composite panels prepared with wet lay-up process. A plain weave 3K AS4 carbon fiber fabric was impregnated with HYSOL® EA9390 epoxy resin (from Henkel Corporation) using standard wet lay-up process and then cut to plies with desired size. The advanced single vacuum bag (AVSB) setup in accordance with an embodiment of the present invention was prepared generally in accordance with the depiction in FIG. 1. Specifically, a non-porous release film and a picture frame made of silicone rubber or sealing tape wrapped with glass fabric were placed on the top surface of a flat tool plate. The resin impregnated carbon fabric plies (18 plies in total) were laid inside the frame. The laminate was then covered in order with (1) peel ply, (2) bleeder plies (one bleeder ply for every 4 plies of wet fabric) and (3) a breathable resin barrier (BRB) ply. A check plate stand made of polycaprolactone with a melting point between 60° C. and 70° C. was placed between the picture frame and the check plate. The breather ply was placed on top of the check plate.

The vacuum bagged assembly was placed into a convection oven and a full vacuum applied. The following heating and curing profile was used:

Full vacuum was applied to the vacuum bag throughout the curing cycle.

The oven was heated to 55° C. and maintained at that temperature for 1 hour.

After 1 hour heating at 55° C., the oven was then heated to 70° C. in 10 minutes and maintained at that temperature for 0.5 hours.

The oven was then heated to 100° C. in 15 minutes and maintained at that temperature for 2 hours.

The oven was subsequently cooled at a rate of ≤3° C./min to room temperature (about 20° C.).

Figure 5:
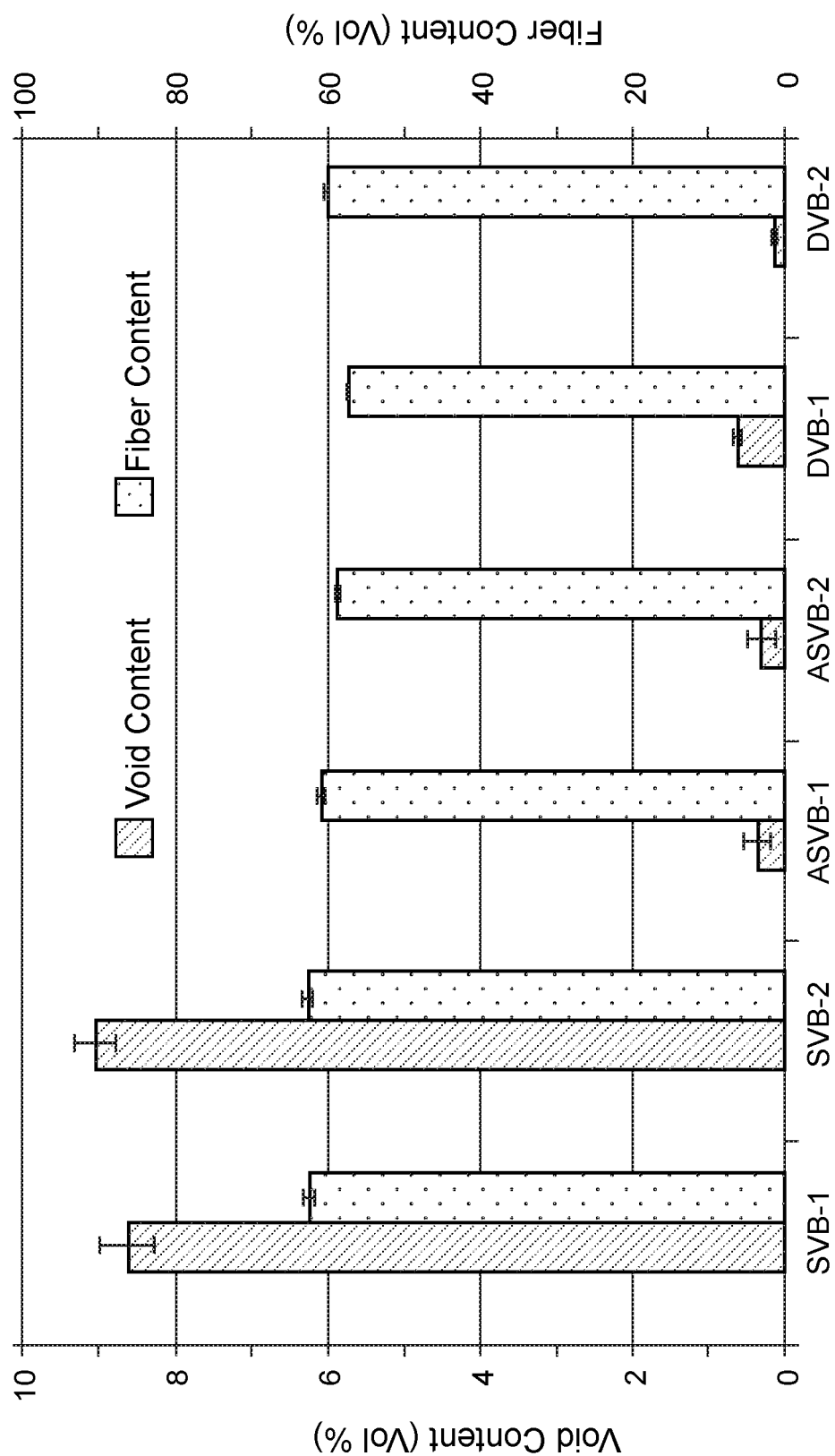
FIG. 5 is a graphical representation comparing the void content and carbon fiber volume content of composite panels fabricated according to an embodiment of the advanced single vacuum bag (ASVB) method of the present invention in comparison to single vacuum bag (SVB) and double vacuum bag (DVB) processes according to the prior art as described in Example 2 below.

The void content of the panels fabricated using the ASVB process as described above were evaluated generally in accordance to ASTM D3171. The results were compared to those of panels fabricated with double vacuum bag (DVB) and single vacuum bag (SVB) fabrication methods according to the prior art and appear graphically as FIG. 5. As can be seen, the composite panels fabricated by the ASVB according to the invention exhibited an average void volume of about 0.33%. In comparison, the panels fabricated by traditional single vacuum bag (SVB) according to the prior art exhibited an average void volume of about 8.8% which was more than 25 times higher than that of the ASVB panels. The void in the panels made with the traditional DVB process is about 0.37% by volume on average.

The results showed that, when fabricating composites from wet prepreg plies, the ASVB process worked as well as the more complex DVB process and much better than the traditional SVB process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method for fabricating an at least partially cured polymer composite structure comprising the steps of:
    (a) positioning an uncured laminate formed of stacked plies of reinforcing fibers impregnated with an uncured resin within an interior space of a vacuum bag;
    (b) positioning a check plate assembly comprised of a check plate and a thermally collapsible check plate stand within the interior space of the vacuum bag relative to the uncured laminate such that the check plate is supported by the thermally collapsible check plate stand and defines a gap between the check plate and a top surface of the uncured laminate;
    (c) drawing a vacuum in the interior space of a vacuum bag;
    (d) removing entrapped air and/or volatiles from the uncured laminate under vacuum by subjecting the uncured laminate to first processing conditions comprised of a first processing temperature for a first predetermined time while maintaining rigidity of the collapsible check stand so as to thereby maintain the gap defined between the check plate and the top surface of the uncured laminate,
    (e) elevating the first processing temperature to a predetermined activation temperature which allows the thermally collapsible check stand to thermally collapse and thereby cause the check plate to fall into compressive contact with the top surface of the uncured laminate; and
    (f) subjecting the uncured laminate under vacuum to second processing conditions comprised of a second processing temperature greater than the predetermined activation temperature for a second predetermined time while maintaining the compressive contact of the check plate to thereby consolidate the stacked plies and form the at least partially cured polymer composite structure.

2. The method according to claim 1, wherein the check plate stand is formed of a thermoplastic material that has a heat deflection or melting point at the predetermined activation temperature which causes the check plate stand to thermally deform to an extent which allows the check plate to compressively contact the uncured laminate during the second processing conditions.

3. The method according to claim 1, wherein step (a) comprises positioning the uncured laminate and the check plate stand on a tool plate, and sealing the vacuum bag to the tool plate so as to surround the uncured laminate and the check plate assembly within the interior space of the vacuum bag.

4. The method according to claim 1, wherein step (a) comprises positioning a dam around a periphery of the uncured laminate.

5. The method according to claim 4, wherein the check plate stand comprises a continuous check plate stand member or a plurality of individual check plate stand members.

6. The method according to claim 4, wherein step (a) comprises positioning the check plate stand on the dam or on the tool plate laterally of the dam.

7. The method according to claim 6, wherein the check plate stand comprises a continuous check plate stand member or a plurality of individual check plate stand members.

8. The method according to claim 1, wherein step (d) comprises allowing air and/or volatile components to escape from the uncured laminate through the gap defined between the check plate and the top surface of the uncured laminate, and exhausting the air and/or volatile components from the interior space of the vacuum bag.

9. The method according to claim 1, further comprising providing a porous breather film surrounding the check plate assembly.

10. The method according to claim 1, further comprising positioning the uncured laminate on a release film.

11. The method according to claim 1, wherein the check plate is formed of a rigid material.

12. A fabrication assembly for fabricating an at least partially cured polymer composite structure from an uncured laminate comprised of stacked plies of reinforcing fibers impregnated with an uncured resin, the fabrication assembly comprising:
a check plate assembly which includes (i) a check plate which is sized and configured to be brought into compressive contact with the uncured laminate positionable therebelow during a processing cycle for the uncured laminate, and (ii) a thermally collapsible check plate stand, and
a vacuum bag which sealingly encloses the check plate assembly and the uncured laminate within an interior space thereof and which is adapted to having a vacuum drawn in the interior space during the processing cycle for the uncured laminate, wherein
the check plate stand is sufficiently rigid below a predetermined elevated temperature during the processing cycle for the uncured laminate to support the check plate relative to the uncured laminate so as to define a gap between the check plate and a top surface of the uncured laminate, but is thermally collapsible at the predetermined elevated temperature during the processing cycle for the uncured laminate to allow the check plate to fall into compressive contact with the top surface of the uncured laminate for a curing time sufficient to thereby consolidate the stacked plies and form the at least partially uncured polymer composite structure.

13. The fabrication assembly according to claim 12, further comprising a tool plate for supporting the uncured laminate, wherein the vacuum bag is sealed to the tool plate.

14. The fabrication assembly according to claim 12, which further comprises a vacuum port connectable to a source of vacuum to allow a vacuum to be drawn within the interior space of the vacuum bag.

15. The fabrication assembly according to claim 12, wherein the check plate stand is formed of a thermoplastic material having a heat deflection or melting point which allows the check plate stand to at least partially melt and collapse at a predetermined elevated activation temperature.

16. The fabrication assembly according to claim 12, further comprising a porous breather film surrounding the check plate assembly.

17. The fabrication assembly according to claim 12, wherein the check plate stand comprises a plurality of thermally collapsible check plate stand members surrounding a periphery of the uncured laminate.

18. The fabrication assembly according to claim 12, wherein the check plate stand comprises a continuous check plate stand member which surrounds a periphery of the uncured laminate.

19. The fabrication assembly according to claim 18, wherein the apparatus comprises a dam positioned on the tool plate which continuously surrounds the periphery of the uncured laminate.

20. The fabrication assembly according to claim 19, wherein the plurality of check plate stand members are supported on the dam.

21. The fabrication assembly according to claim 12, wherein the check plate assembly comprises a check plate profile member adapted to thermally conform to an irregular or contoured surface of the uncured laminate.

22. The fabrication assembly according to claim 21, wherein the check plate profile member is formed of a thermoplastic material.

* * * * *